Feb. 14, 1967  T. B. MICHAELS  3,304,486
VOLTAGE REGULATION FOR A.C.-TO-D.C. CONVERTERS
Filed May 17, 1963  2 Sheets-Sheet 1

INVENTOR.
THOMAS B. MICHAELS
BY
*T. L. Styner*
ATTORNEY

Feb. 14, 1967  T. B. MICHAELS  3,304,486
VOLTAGE REGULATION FOR A.C.-TO-D.C. CONVERTERS
Filed May 17, 1963  2 Sheets-Sheet 2

United States Patent Office 3,304,486
Patented Feb. 14, 1967

3,304,486
VOLTAGE REGULATION FOR A.C.-TO-D.C. CONVERTERS
Thomas B. Michaels, Rochester, N.Y., assignor to General Dynamics Corporation, Rochester, N.Y., a corporation of Delaware
Filed May 17, 1963, Ser. No. 281,292
7 Claims. (Cl. 321—18)

This invention relates to A.C.-to-D.C. converters and is particularly directed to phase controlled rectifiers for voltage regulation in the converter.

It is common in systems for converting single-phase or polyphase alternating current to direct current to employ rectifiers having control electrodes which regulate the phase angle of the primary A.C. source at which the rectifiers "fire". Theoretically, if the firing time of a rectifier can be regulated from 0° to 180° throughout the positive loop of the source wave, voltage regulation from 0 to 100% may be obtained. Unfortunately, the firing angle is difficult to measure. The starting point for measuring time, and hence the phase angle, is not easily established.

An object of this invention is to provide an improved phase controlled A.C.-to-D.C. power converter.

A more specific object of this invention is to provide improved means for establishing the time of the triggering pulse in terms of the phase of the power wave.

The objects of this invention are attained by a resistance-capacity timing circuit which is kept completely discharged until a precisely predetermined point in time, in terms of degrees of phase of the power wave, is detected. Thereupon the charging current for the RC circuit starts. The charging rate is easily controlled by varying the resistance and/or capacity of the RC circuit. When the charge has attained a predetermined level, conduction is initiated suddenly in a unijunction transistor. The transistor current is differentiated to generate the necessary voltage spike to trigger the power rectifier. According to this invention, the mentioned point in time is precisely determined by detecting the instant when the voltages of two waves of the three-phase source, which are 120° apart, are equal.

Other objects and features of this invention will become apparent to those skilled in the art by referring to the specific embodiment described in the following specification and shown in the accompanying drawings in which.

Figure 3:
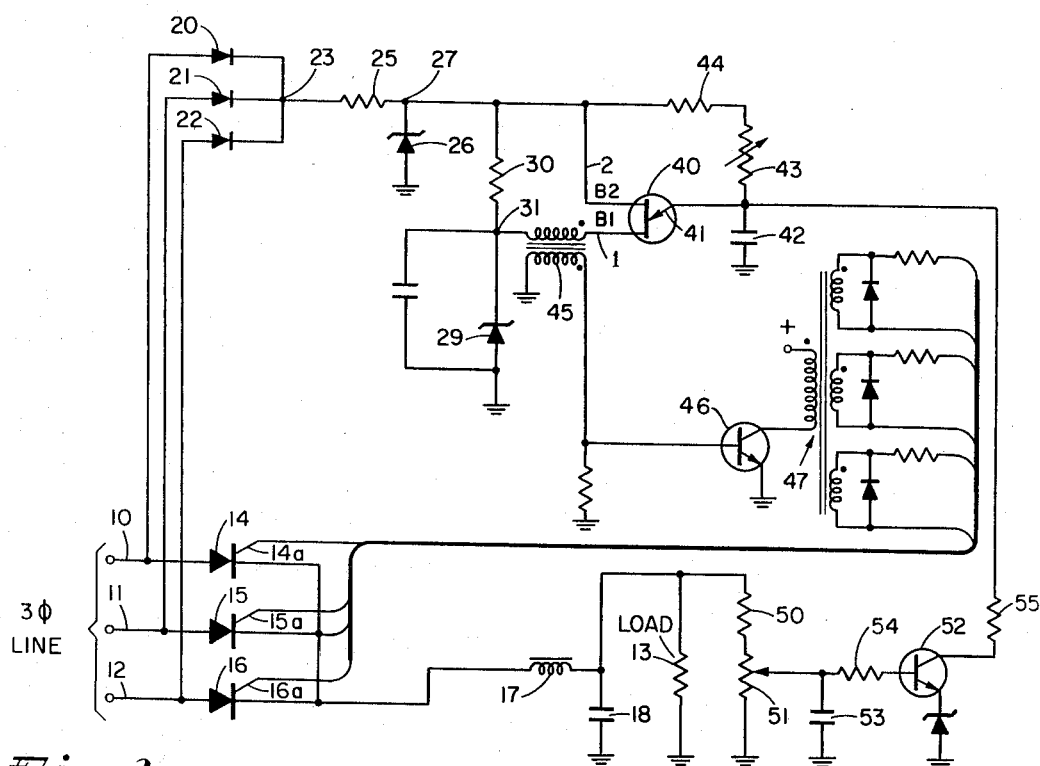
FIG. 3 is a circuit diagram of one embodiment of this invention.

In FIG. 3 is shown lines 10, 11 and 12 of a three-phase power source, and at 13 is shown a load impedance to which a direct current is to be supplied. According to this invention, the direct current at the load is to be regulated manually and/or automatically through a wide range. The particular rectifiers for converting the alternating current power to direct current power are shown at 14, 15 and 16. The rectifiers 14–16 are of the type commercially known as silicon-controlled rectifiers. These rectifiers are of the solid-state semi-conductor type having triggering electrodes 14a, 15a and 16a for initiating forward conduction, in much the same manner as the control grid of a gaseous discharge device. The cathode electrodes of the rectifiers are connected together and through smoothing choke coil 17 to the load 13. Smoothing condenser 18 may be connected across the load, as required. Whether or not the primary three-phase voltages are referred to ground depends upon whether the power supply is delta or Y connected.

In the upper portion of FIG. 3 is shown the circuitry of this invention for deriving triggering pulses for the trigger electrodes 14a–16a. The three phases of the A.C. source are applied to the diodes 20, 21 and 22 for half-wave rectification. At the common output terminal 23 is obtained the series of overlap unidirectional sinusoidal pulses, the waveforms of which are shown at 24 in FIG. 1. Since each of the waves of the three-phase source are 120° apart, it will be noted that the instantaneous voltage of any two adjacent waves are equal, or crossover, midway between the peaks of the two waves or just 60° from either peak. At the crossover point, the voltage of either wave is one-half the peak voltage, inasmuch as $\cos 60° = 0.5$. These facts become important as will hereinafter appear.

Figure 1:
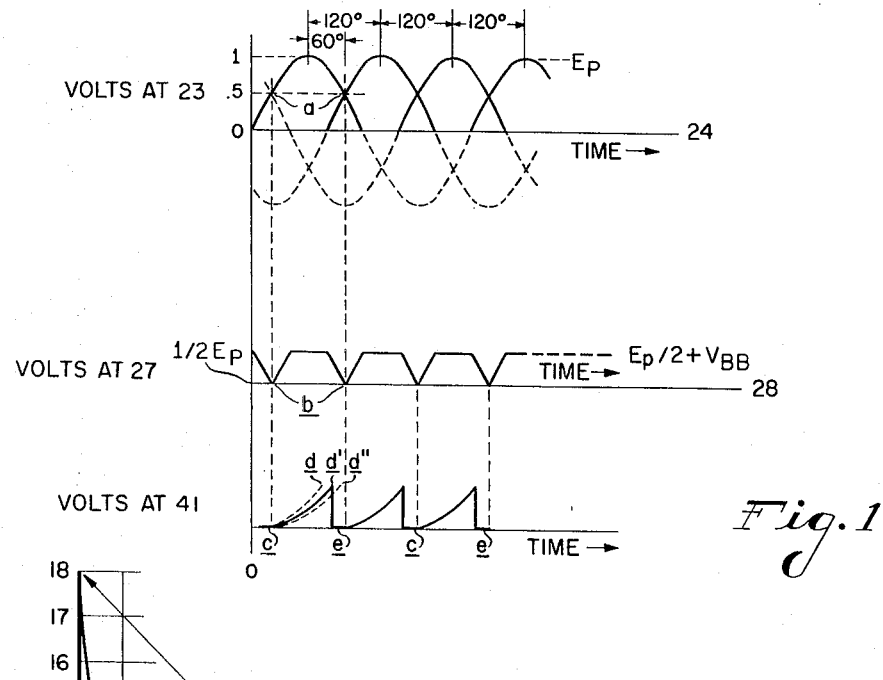
FIG. 1 shows voltage diagrams at selected points in the circuits of this invention.

The junction 23 of the three-phase rectifiers has an undulated unidirectional voltage. Where the peak-to-peak alternating voltage of the source is $E_p$, the minimum voltage at junction 23 is $E_p/2$. Junction 23 is connected to ground through current-limiting resistor 25 to voltage clamp devices 26 and 29. The clamp devices are diodes each of which has a distinct avalanche or breakdown voltage for establishing the maximum voltage across the terminals of the device. Such diodes are commonly termed "zener diodes" and may be obtained commercially to provide any desired rated terminal voltage. Diode 26 is connected directly between terminal 27 and ground, while diode 29 is connected in series with coupling resistance 30 between terminal 27 and ground. Importantly, the rated clamp voltage or diode 29 is equal to the mentioned $E_p/2$ voltage, while the clamp voltage of diode 26 is of some higher value intermediate $E_p/2$ and $E_p$. In FIG. 1, the difference in clamping voltages is indicated as $V_{BB}$. In one successful embodiment of the circuits of FIG. 3, the clamp voltage of diode 29 was, for example, 90 volts, while the clamp voltage of diode 26 was 122 volts, so that the maximum voltage swing, $V_{BB}$, across resistance 30 was 32 volts.

According to another important feature of this invention, base-1 and base-2 of unijunction transistor 40 are connected, respectively, to junction 31 and junction 27 at opposite ends of coupling resistance 30. Pulse signals which appear in the base-1 circuit are coupled out through transformer 45. The unijunction transistor 40 further comprises emitter electrode 41 which controls initiation of current conduction in transistor 40. Emitter 41 is connected to the RC timing circuit comprising storage condenser 42, an adjustable resistor 43 and fixed resistor 44. The timing circuit is connected between ground and junction 27.

Figure 2:
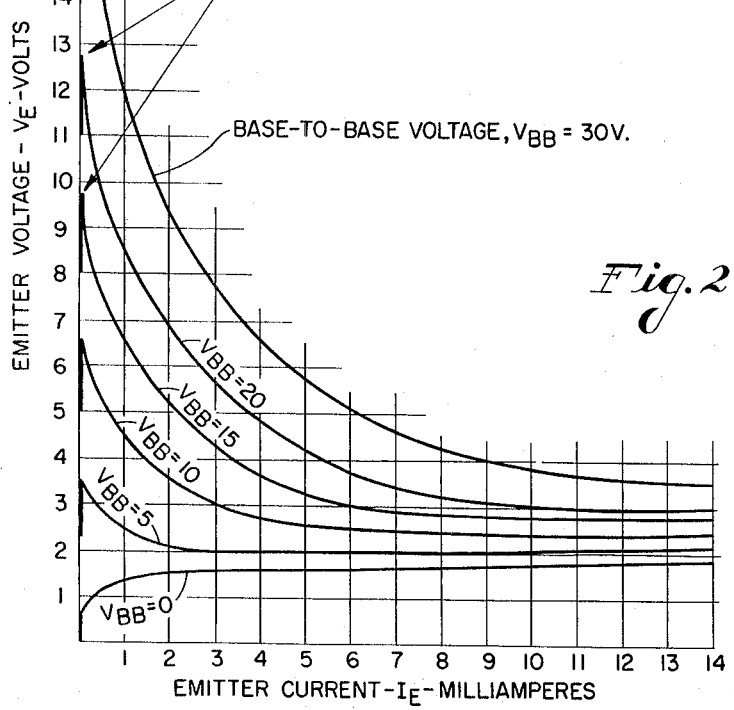
FIG. 2 are curves showing the emitter current-emitter voltage characteristic of the unijunction transistor importantly employed in the circuit of this invention.
Figure 4:
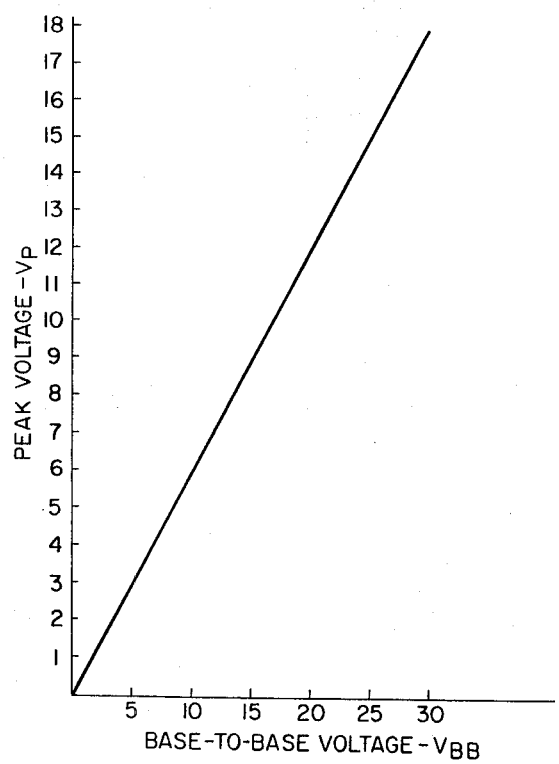
FIG. 4 shows the base-to-base voltage versus peak voltage characteristic of the unijunction transistor importantly employed in FIG. 3.

In one commercially obtainable unijunction transistor, the resistance between the bases of a lightly doped silicon body is of the order of 10,000 ohms when nonconducting and of the order of 100 ohms when conducting. FIG. 2 shows a family of emitter current-emitter voltage characteristics for the transistor 40 where various voltages from 0 to 30 volts are applied between the bases. As shown in FIG. 2, if the emitter voltage $V_E$ is less than the emitter peak point voltage $V_p$, the emitter will be reversely biased and only a small reverse leakage current will flow. However, when $V_E$ is equal to $V_p$ and the emitter current $I_E$ increases slightly to a value greater than the peak point current, the unijunction transistor will turn on. In the on condition, the resistance between the emitter and base-1 drops suddenly to a low value and the emitter current will be limited only by the series resistance of the emitter-to-base-1 circuit. According to another important characteristic of the unijunction transistor 40, the ratio of peak point voltage, $V_p$, to interbase voltage $V_{BB}$ is fixed for each transistor. That is, $$V_p \approx n \times V_{BB}$$

where factor $n$ is a constant depending upon the composition and structure of the transistor. This factor is called the stand-off ratio and is intrinsic in any unijunction transistor and is relatively independent of bias conditions. FIG. 4 shows the linear relation of the peak voltage and base-to-base voltage of one unijunction transistor successfully employed in FIG. 3. The value of $n$ lies in the region between 0.5 and 1. Importantly, if the voltage between base-1 and base-2 drops to zero, the transistor will fire inasmuch as the peak voltage $V_p$ is exceeded. The emitter voltage promptly drops to and is firmly held at the voltage established on base-1 by the clamping action of diode 29. When the voltage of base-2 rises above the voltage of base-1, the emitter current stops.

The RC time circuit connected to emitter 41 comprises the storage condenser 42 and the charging resistor 43. If either resistor 43 or condenser 42 is adjustable, the RC time constant is adjustable. Preferably, the resistor 44 of some low ohmic value is connected between resistor 43 and junction 27, so that the R of the timing circuit cannot be reduced to zero. Current in the base-1 circuit is differentiated in the output coupling impedance shown in the example of FIG. 3 as transformer 45. Preferably, the pulses in the transformer are amplified in transistor 46 and are coupled through the windings of transformer 47 to the three trigger electrodes 14a, 15a and 16a of the silicon-controlled rectifiers 14, 15 and 16.

In operation, the rectified and clipped three-phase voltage is applied across resistor 30. Junction 31 and base-1 are clamped at one-half the peak voltage, $E_p$. Junction 27 varies, as shown on line 28, FIG. 1, between $E_p/2$ and some higher clamped voltage, $E_p/2 + V_{BB}$. At each crossover point a, FIG. 1, of two of the three waves, junction 27 will drop momentarily to a value equal to $E_p/2$, as shown at b, FIG. 1. At that instant, the interbase voltage is zero. But, the base-2 voltage immediately rises again, shutting off the unijunction transistor, and permits condenser 42 at that moment to start charging. The start of the RC timing function at c, FIG. 1, is thus precisely determined. The unijunction transistor will not again fire until the storage condenser 42 charges to a voltage exceeding the peak voltage $V_p$ corresponding to the interbase voltage, $V_{BB}$, determined by the intrinsic stand-off ratio, $n$. This second firing, at time d, d' or d", etc., is controlled by the charging rate established in the RC circuit 42, 43. Since the instant at which the storage condenser starts charging is precisely established by the crossover points of the rectified wave, the time in phase angle at which the condenser discharges is accurately controlled and is not subject to temperature changes or variations in parameters of the circuit. Additionally, the unijunction transistor continues to conduct and continues to hold condenser 42 discharged, during interval e, until the next succeeding crossover point.

The voltage generated by the sudden discharge of storage condenser 42 through the emitter-base-1 circuit of the transistor induces a sharp voltage spike in the output circuit comprising, in the embodiment shown in FIG. 3, the windings of the transformer 45. Where the energy content of the voltage spike may be inadequate, amplifier 46 is employed. The amplified voltage spike is simultaneously applied, through transformer 47, to the control electrodes 14a, 15a and 16a of the power rectifiers 14, 15 and 16. The particular power rectifier which is forwardly biased at the instant of the triggering pulse will start conduction. It is apparent, then, that the duration of the rectified pulse and the D.C. voltage applied to the load 13 is a function of the time constant of the RC circuit 42, 43.

Conveniently, automatic voltage regulation is effected in the circuit of this invention by sampling the voltage across the load 13 and applying that sampled voltage to a transistor in the RC time constant circuit. In FIG. 3, the potentiometer 50, 51 is connected across the load 13 and an adjustable portion of the load voltage is applied to amplifier 52 after smoothing by condenser 53 and resistance 54. The amplifier 52 is of the P-N-P type with the emitter clamped to some voltage above ground. The collector is connected through resistance 55 directly to the junction of the RC time constant circuit 42, 43. The voltages are polarized so that the time constant is increased or decreased by the emitter-collector resistance to counter decrease or increase of load voltage.

One embodiment of the voltage regulator of FIG. 3 was particularly effective in good wide range voltage regulation of the load voltage supplied from a three-phase 127-volt alternating current source where the principal components had the following values:

| | | |
|---|---|---|
| Resistance 25 | ohms | 1500 |
| Resistance 30 | do | 56,000 |
| Resistance 44 | do | 47 |
| Resistance 43 | do | 25,000 |
| Condenser 42 | microfarad | 0.66 |
| Transistor 40 | | 2N491 |
| Diode 26 | | 1N3005B |
| Diode 29 | | 1N3005B |

Many modifications may be made in the specific diodes and transistors of the circuit of FIG. 3 with appropriate resistance and voltage changes without departing from the scope of this invention. For example, the rated clamping voltage of diodes 26 and 29 may be increased or decreased as desired to accommodate various line voltages and to produce desired interbase voltages across coupling resistor 30. Further, the phase-controlled triggering pulse may be coupled out of the base-1 circuit via the transformer 45, as shown, or through resistive coupling means. Likewise, transformer 47 may be replaced with other types of inductive or resistive couplings. Since the voltage across coupling resistor 30 always momentarily becomes zero, the starting time for charging condenser 42 is established and does not vary with changing characteristics of the semiconductor devices or changing voltages.

What is claimed is:

1. A system for generating a sync pulse for each wave of a three-phase A.C. source, said system comprising a three-phase A.C. source, a rectifier connected between each phase line of said A.C. source and a common terminal for producing at said terminal a direct current with triple-frequency pulses, a coupling resistor connected between said common terminal and reference ground, a first and a second voltage clamp with, respectively, a high and a low voltage clamping level connected, respectively, to opposite ends of said resistor, said low clamping level being substantially equal to one-half the rectified peak voltage of said A.C. source, a unijunction transistor comprising a solid-state semiconductor device with a first and a second base electrode and an emitter, the base electrodes being connected, respectively, to the clamped ends of said resistor so that when the base-to-base voltage momentarily equals zero each time said two phases are momentarily equal whereupon emitter-base-1 current is interrupted, and a RC timing circuit connected to said emitter and said common terminal and including a condenser and resistance means, said condenser being adapted to begin to charge when said unijunction transistor is shut off and discharge, turning on said unijunction transistor, at a precise charged level.

2. A system for regulating a three-phase A.C.-to-D.C. converter comprising a three-phase A.C. source, means coupled to said A.C. source for developing half-wave rectified voltages, a unijunction transistor coupled to said rectifying means and having base-1, base-2 and emitter electrodes wherein the peak voltage for firing the transistor is a fixed ratio of the base-to-base voltage, means for clamping the voltage of base-1 at a value one-half the peak voltage of the rectified wave, an RC circuit having a tuning condenser and resistance means, said tuning condenser connected across the emitter-base-1 circuit, means for charging said condenser, and means for applying rectified half-wave voltages of the three-phase source to said base-2 so that the base-to-base voltage drops momentarily to zero at 120° intervals and said condenser charging starts, and means responsive to the discharge of said capacitor for converting said three-phase A.C. source to a D.C. current.

3. A system for initiating the charging of a condenser in an RC timing circuit at a precise angle the wave of a polyphase voltage source, the system comprising a polyphase A.C. source and rectifying means coupled to said source and adapted to develop an undulating rectified alternating voltage wave of a constant frequency, a unijunction transistor coupled to said rectifying means and having base-1, base-2 and emitter electrodes, the peak emitter voltage for initiating current in the emitter-base-1 circuit of said transistor being a fixed function $n$ of the base-to-base voltage, a coupling resistor connected between said bases and said rectifying means, a voltage clamp device connected to the base-1 end of said resistor for clamping the base-1 at a voltage corresponding to the crossover voltage of two adjacent waves of said rectified wave, an RC timing circuit coupled between said emitter electrode and said rectifying means and including a storage condenser and adjustable resistance means, a second voltage clamp device connected to the base-2 end of said resistor for clamping said base-2 voltage at some voltage intermediate the clamped voltage of said base-1 and the peak voltage of said rectifying means so that said unijunction transistor becomes nonconducting and said condenser begins to charge at the instant of said crossover.

4. In a voltage regulation system for an A.C.-to-D.C. converter comprising a three-phase A.C. source and a controlled power rectifier in each phase line having a phase controlling trigger electrode, means for rectifying each of the three phases to produce unidirectional pulses 120° apart, a unijunction transistor having base-1, base-2 and emitter electrodes, a coupling resistor coupled to said rectifying means, the ends of said coupling resistor being connected, respectively, to the base-1 and base-2 electrodes of said transistor, a voltage limiting diode connected to the base-1 end of said coupling resistor for fixing the voltage of said base-1 at a value equal to the crossover voltage of said unidirectional pulses so that the voltage across said coupling resistor and the base-to-base voltage momentarily drops to zero at each crossover point in the rectified three-phase wave, said unijunction transistor being adapted to be shut off at said crossover voltage, an RC circuit including an adjustable resistor and a timing condenser connected across the emitter-base-1 circuit of said transistor and a voltage source coupled to said timing circuit for beginning to charge said condenser at the instant defined when said cross voltage is reached, said condenser being adapted to discharge after a predetermined interval of time, responsive to discharge of said condenser, and means for applying a control signal to the trigger electrodes of said power rectifiers.

5. A system for controlling the charging of a condenser from a source of undulating voltage of constant frequency comprising
 (a) a unijunction transistor having a semiconductive body and a base-1, a base-2, and emitter electrodes,
 (b) circuit means connecting said source to said base-1 electrode and said base-2 electrode for conditioning said transistor into its conductive state until the voltage between said base electrodes reaches a predetermined level, and
 (c) an RC timing circuit coupled to said source and including a condenser connected to said emitter electrode and having a discharge path through said transistor from said emitter electrode to one of said base electrodes when said transistor is in its conductive state,
 (d) said timing circuit including resistance means for applying the voltage from said source to said condenser for charging said condenser at a controlled rate after the voltage between said base electrodes reaches said predetermined level,
 (e) said circuit means comprising a coupling resistor the ends of which are respectively connected to said base-1 and base-2 electrodes, a first zener diode connected to the base-1 end of said resistor clamping the voltage level on said base-1 electrode, at said predetermined level, and a second zener diode connected to said base-2 end of said resistor and clamping said base-2 electrode at a voltage level intermediate between the peak voltage of said undulating voltage and said predetermined level.

6. The invention as set forth in claim 5 including additional means coupled to said discharge path of said condenser and adapted to derive a control pulse when said condenser discharges.

7. The invention as set forth in claim 6 including a load resistor coupled to said power rectifiers and means responsive to the variations in voltage applied across said load resistor to change the rate of charge of said capacitor.

References Cited by the Examiner
UNITED STATES PATENTS 3,150,307  9/1964  Kaeding.
3,151,288  9/1964  Avizienis et al.
3,177,418  4/1965  Meng.
3,193,709  7/1965  Baxter et al. _____ 307—88.5

JOHN F. COUCH, *Primary Examiner.*

M. L. WACHTELL, *Assistant Examiner.*